(12) United States Patent
Williams et al.

(10) Patent No.: US 11,362,743 B1
(45) Date of Patent: Jun. 14, 2022

(54) SYSTEMS AND METHODS FOR TDR USING STANDING WAVES AND AN INJECTED TEST SIGNAL

(71) Applicant: CABLE TELEVISION LABORATORIES, INC., Louisville, CO (US)

(72) Inventors: Thomas Holtzman Williams, Longmont, CO (US); Lin Cheng, Superior, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 17/410,967

(22) Filed: Aug. 24, 2021

Related U.S. Application Data

(60) Provisional application No. 63/069,416, filed on Aug. 24, 2020.

(51) Int. Cl.
| | |
|---|---|
| *H04B 3/46* | (2015.01) |
| *H04B 17/17* | (2015.01) |
| *H04L 27/26* | (2006.01) |
| *H04B 17/00* | (2015.01) |

(52) U.S. Cl.
CPC ......... *H04B 17/17* (2015.01); *H04B 17/0085* (2013.01); *H04L 27/26526* (2021.01)

(58) Field of Classification Search
CPC ........ H94B 1/1027; H04B 1/62; H04B 17/11; H04B 1/0458; H04B 7/0465; H04L 25/08; H04L 27/368; H04L 27/2089; H04L 27/2636
USPC ....................................................... 375/224
See application file for complete search history.

(56) References Cited

U.S. PATENT DOCUMENTS

| | | | | |
|---|---|---|---|---|
| 2007/0274471 | A1* | 11/2007 | Shako | H03F 1/3247 379/88.01 |
| 2015/0099478 | A1* | 4/2015 | Wyville | H03H 11/344 455/114.3 |
| 2020/0092150 | A1* | 3/2020 | Choi | H04L 27/2636 |

* cited by examiner

*Primary Examiner* — Khai Tran
(74) *Attorney, Agent, or Firm* — Lathrop GPM LLP

(57) ABSTRACT

Systems and methods provide for a network test that by capturing in-phase values of a reflected signal off a transmission medium or irregularity therein. The in-phase values are converted to time-domain, which is then halved and converted back to the frequency domain to identify calculated quadrature values associated with the measured in-phase values. The measured in-phase values and calculated quadrature values may be used to determine impedance reflection/transmission characteristics of transmission medium or an irregularity therein. The measured in-phase values and calculated quadrature values may be used to determine if the transmission medium is minimum phase.

26 Claims, 13 Drawing Sheets

SYSTEMS AND METHODS FOR TDR USING STANDING WAVES AND AN INJECTED TEST SIGNAL

CROSS-REFERENCE TO RELATED APPLICATIONS

This application benefits from and claims priority to U.S. provisional patent application Ser. No. 63/069,416, filed on Aug. 24, 2020, the disclosure of which is incorporated herein by reference in its entirety.

BACKGROUND

The field of the disclosure relates generally to data transmission systems, and more particularly, systems and methods for identifying irregularities in transmission mediums used by data transmission systems.

Network analysis is incredibly important to communications systems. For data to be transmitted, the channel response needs to be known to eliminate inter-symbol interference. Prior art solutions are to use training signals (also known as reference signals, ghost-canceling signals, or pilot signals) to establish channel response. Another prior solution is blind equalization.

A test instrument that can perform channel characterization is a Vector Network Analyzer. These devices are expensive and use a swept continuous wave (CW) signal to measure complex frequency responses in networks. Complex frequency responses involve measuring in-phase and quadrature samples at many frequencies. This invention shows complex data can also be derived from in-phase only data with signal processing. With complex time or frequency samples, discrete Fourier transforms can be performed, revealing time delay or group delay.

It is therefore difficult, in conventional data transmission systems, to discover line defects, such as loose fittings and radial cracks, where an easily detectable echo tunnel is not formed because only one impedance mismatch is encountered. This problem is rendered more difficult due to the fact that time domain reflectometer (TDR) test equipment (e.g., Vector Network Analyzers) may not always be used on in-service cable plant. Accordingly, there is a need to be able to locate irregularities on an in-service data transmission line when only one impedance mismatch is present.

Additionally, conventional cable operators experience a problem with aging cable lines that, over time, experience a variety of irregularities. A shield break in the cable line, for example, is an irregularity producing a discrete reflection from one point in the line. Other irregularities, such as water seeping into the cable, will increase signal attenuation through the cable, even if the seepage only sometimes produces reflections. Additional irregularities include pirate taps, such as a splitter or directional coupler, tapping the cable line. One conventional solution utilizes a network analyzer to measure a length of coaxial cable, but only when both ends of the measured length are in the same location. When the ends are not located together, a transmitter may be placed at one end of the measured length, and a receiver at the other end. A training signal is transmitted from end to end, and channel response phase information and magnitude are computed for the captured training signal. This solution is not implemented on an in-service line. Network analyzers, however, are extremely expensive and in some instances, require the service to be suspended in order for the analyzer to obtain desired information for analyzing the network.

SUMMARY OF THE EMBODIMENTS

The embodiments discussed herein resolve the above-described deficiencies for systems and methods that perform time-domain reflectometry on a given transmission medium (not limited to just cable lines, but may also apply to other transmission medium types such as wireless transmission mediums, mmWave technologies, phone lines, acoustic lines, optical fibers, or others). In particular, embodiments address the realization that network analyzers are too expensive to implement on a wide-spread basis and they require to put the tested network out of service during the test. The embodiments discussed herein resolve this realization by providing a cost-effective testing device that is capable of operating analyzing the network whether the network is in service or out of service. This cost-effective testing device may be easily attached to the network (such as via a hand-held testing device), or hardwired and located at a variety of locations throughout the network, including taps as well as being part of network end devices such as cable set-top boxes and other network hardware. Moreover, the embodiments discussed herein provide a testing algorithm that provides improved insight into the actual irregularity as opposed to just identifying distance of the irregularity from the testing device. Such improved insight includes determining whether the irregularity is from a short or an open circuit. This allows the network operator, or service technician, to adequately identify the potential irregularity and appropriately look for the cause thereof when correcting the irregularity.

In a first aspect, a method for locating an irregularity on a transmission medium, includes: transmitting, from a network testing device on the transmission medium, a plurality of carrier signals each corresponding to a carrier frequency of a plurality of carrier frequencies spanning a carrier frequency bandwidth; receiving, at the network testing device, a plurality of reflection signals, each reflection signal corresponding to one of the carrier signals reflected off an irregularity in the transmission medium; identifying a frequency-domain response by, for each of said reflection signal, recording an in-phase value of the reflection signal as related to a sampled component of the corresponding carrier signal; converting the frequency-domain response to a time-domain response by performing an inverse discrete Fourier transform (IDFT) using the recorded in-phase values, and zero as each corresponding quadrature value in the IDFT; generating a halved time-domain response by discarding mirror image values of the time-domain response; calculating quadrature values of the frequency-domain by performing a Discrete Fourier transform (DFT) on the halved time-domain response; and determining a impedance reflection/transmission characteristic of the irregularity based on one or both of the in-phase value and the calculated quadrature values.

In a second aspect, a system for identifying an irregularity in a transmission medium, includes: a carrier signal generator; a transmission port coupled to the carrier signal generator that, when the system is in operation, is coupled to the transmission medium, wherein a plurality of carrier signals are input into the transmission medium via the transmission port; a receiver port that, when the system is in operation, receives a plurality of reflection signals each corresponding to one of the carrier signals reflected off of an irregularity within the transmission medium; a mixer having: an input port coupled to the receiver port, a local oscillator (LO) port, wherein a sample component of an output of the carrier signal generator is input to the LO port, and an output port that outputs an intermediate frequency (IF) signal; an analog-to-digital converter (ADC) coupled to the output port; and, a processor coupled to the tunable oscillator and the ADC and configured to control the system to identify distance between the system and the irregularity based on in-phase signals, as related to the sampled component, output by the ADC.

In a third aspect, method for determining if a network is minimum phase, includes: transmitting, from a network testing device on a transmission medium, a plurality of carrier signals each corresponding to a carrier frequency of a plurality of carrier frequencies spanning a carrier frequency bandwidth; receiving, at the network testing device, a plurality of reflection signals, each reflection signal corresponding to one of the carrier signals reflected off an irregularity in the transmission medium; identifying a frequency-domain response by, for each of said reflection signal, recording an in-phase value of the reflection signal as related to a sampled component of the corresponding carrier signal; converting the frequency-domain response to a time-domain response by performing an inverse discrete Fourier transform (IDFT) using the recorded in-phase values, and zero as each corresponding quadrature value in the IDFT; generating a halved time-domain response by discarding mirror image values of the time-domain response; calculating quadrature values of the frequency-domain by performing a Discrete Fourier transform (DFT) on the halved time-domain response; and comparing the calculated quadrature values to measured quadrature values; and identifying the network as minimum phase when the calculated quadrature values are equal, within a threshold value, to the measured quadrature values.

DETAILED DESCRIPTION OF THE EMBODIMENTS

Figure 1:
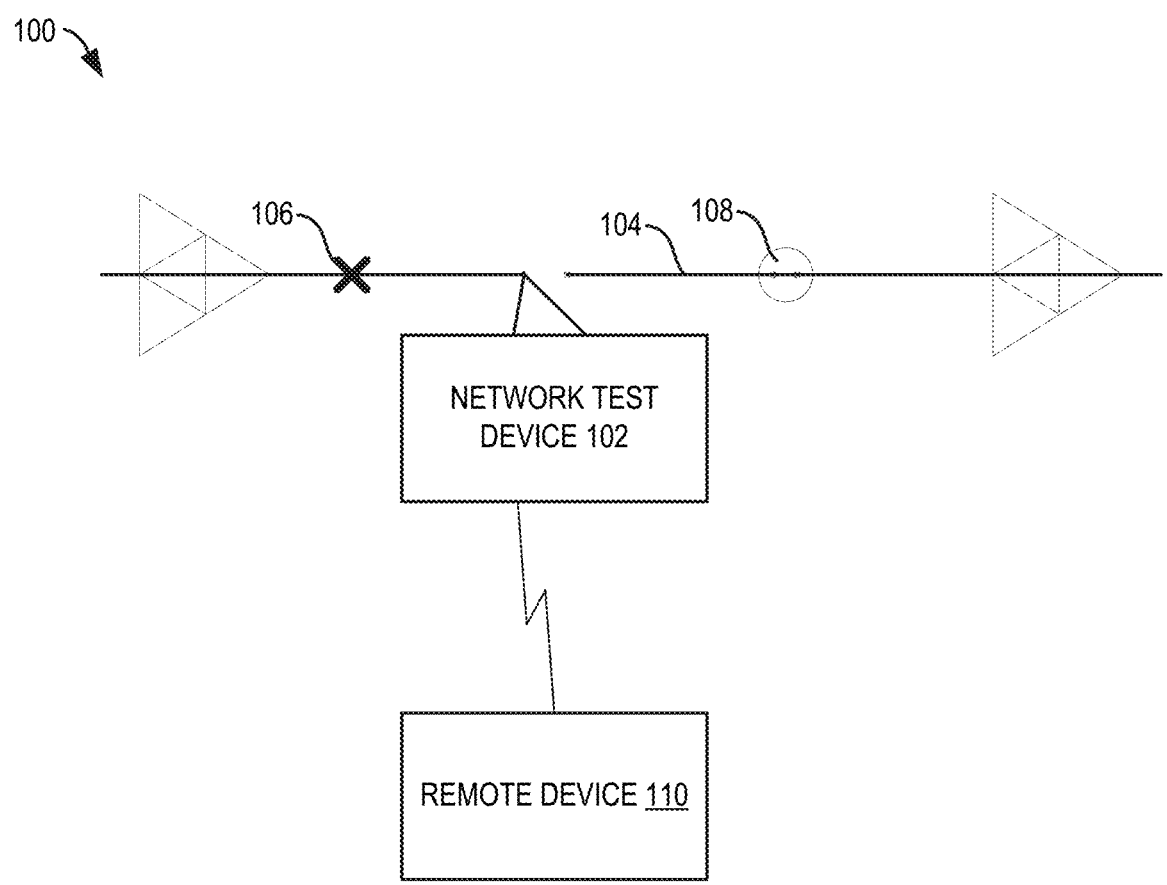
FIG. 1 illustrates a system for time-domain reflectometry using standing waves and an injected test signal, in embodiments.

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), a field-programmable gate array (FPGA) that has been previously programmed to implement the functionality described herein, and other programmable circuits and/or circuits capable of executing instructions to implement functionality discussed herein, and these terms are used interchangeably herein. In the embodiments described herein, memory may include, but is not limited to, a computer-readable medium, such as a random-access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

FIG. 1 illustrates a system 100 for time-domain reflectometry using standing waves and an injected test signal, in embodiments. System 100 includes a network test device 102 that is coupled to a transmission medium 104 and configured to perform time-domain reflectometry on the transmission medium 104 to identify one or more irregularities 106 which may be upstream or downstream from the location of the network test device 102.

The network test device 102 may be coupled directly to the transmission medium 104, or may be indirectly coupled to the transmission medium 104 via one or more taps (e.g., tap 108), probes, etc.

The transmission medium 104 is shown as a cable-line transmission medium in FIG. 1. However, it should be appreciated that other types of transmission mediums may be analyzed using the network test device 102 without departing from the scope hereof. For example, the transmission medium 104 may be any one or more of a wireless transmission medium, mmWave technology transmission medium, phone line, acoustic line, optical fiber, device under test (DUT), transmission medium associated with DOCSIS® 3.0 or 3.1, 4.0, or others. For example, testing in the upstream band 5-42 MHz or 5-85 MHz requires a signal to be supplied, as there are no continuous digital carriers in a DOCSIS® upstream system. A swept signal can be inserted into a tap port and a standing wave may be observed on the seizure screw of the tap. Note that the test signal does not need to be limited to just 42 MHz or 85 MHz (assuming no return equalizer in the tap) and return band testing is desirable for very long echoes because the cable loss is lower.

The irregularities 106 may include one or more of a shield break in the cable line, water seeping into the cable, pirate taps, such as a splitter or directional coupler, tapping the cable line, or other line breaks (such as shorts or open circuits).

Figures 2A, 2B:
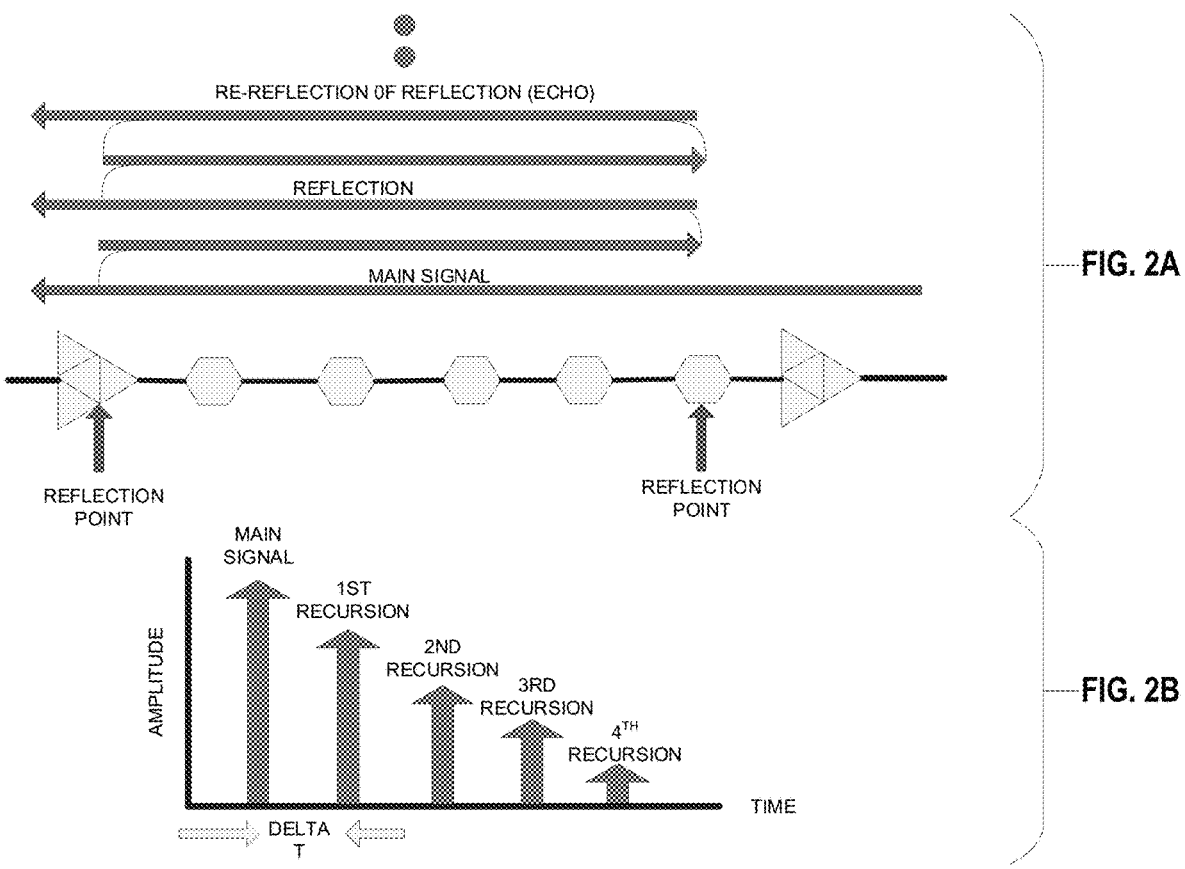
FIGS. 2A and 2B show a block diagram of an example echo tunnel created by a pair of impedance mismatches caused by an irregularity.

FIGS. 2A and 2B show a block diagram of an example echo tunnel created by a pair of impedance mismatches caused by an irregularity 106. The echoes bounce back and forth between impedance matches, creating standing waves. This echo tunnel can be observed at an endpoint, either in a home or the headend. However, while the length of the echo tunnel can be determined, the actual location of the tunnel is unknown. In both cases, the wider the test bandwidth, the greater the accuracy in measuring the echo's delay. However, the network test device 102 used herein provides the ability to not only identify the distance away from the network testing device 102, but in certain circumstances identify other characteristics of the irregularity (such as an open or short circuit).

Figure 3:
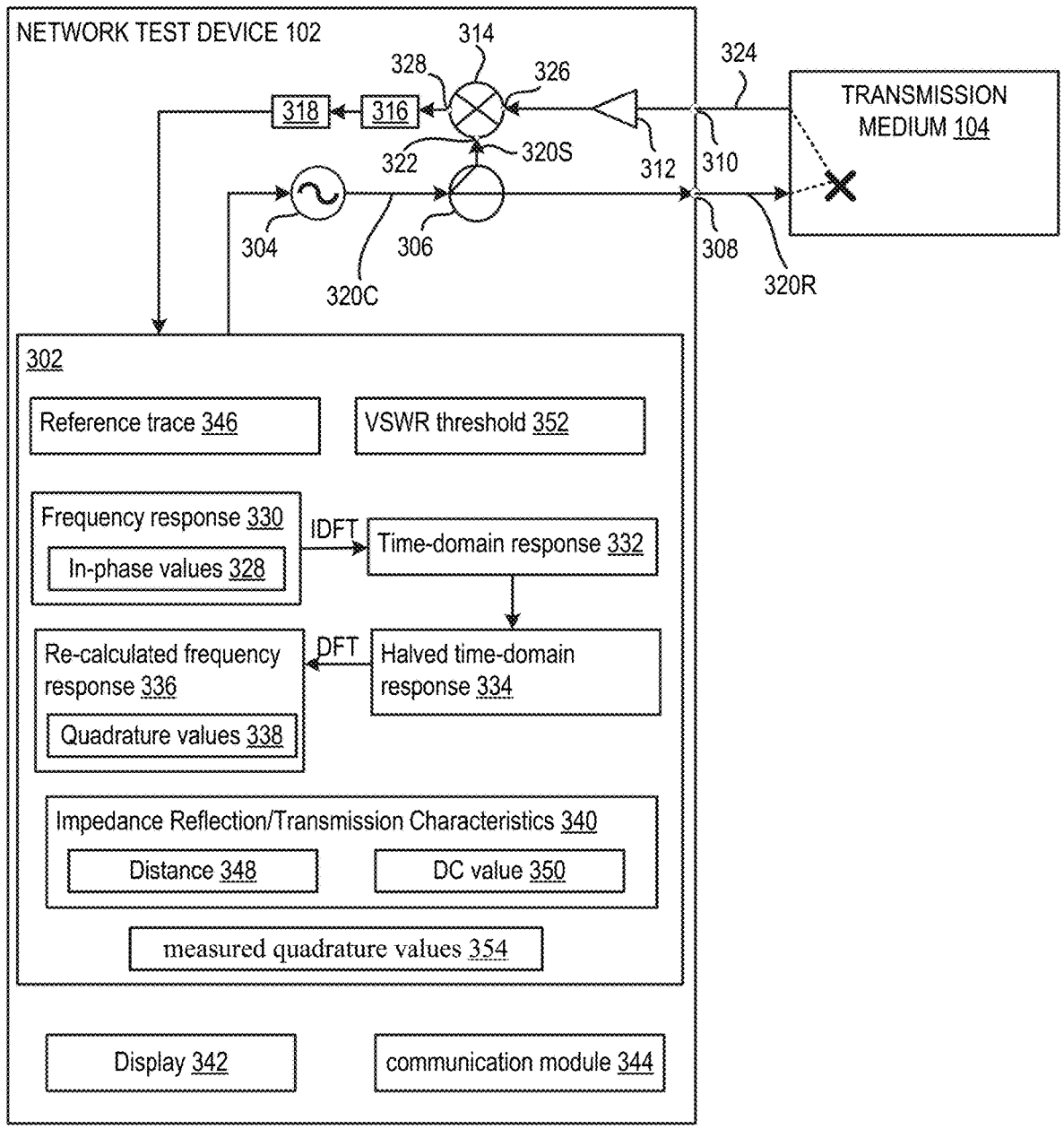
FIG. 3 depicts the network test device in further detail, in embodiments.

FIG. 3 depicts the network test device 102 in further detail, in embodiments. Components shown in FIG. 3 associated with network test device 102 include a controller 302, a tunable oscillator 304, a directional coupler 306, a transmission port 308, a receiver port 310, an amplifier 312, a mixer 314, a filter 316, and an analog-to-digital converter (A-D) 318. Transmission port 308 and receiver port 310 may include further hardware necessary to implement transmitting and receiving signals (e.g., a transmission antenna and receiving antenna) depending on the specific application of the test device 102. It should be appreciated that various embodiments of the network test device 102 do not include all of these components, such as amplifier 312 and/or filter 316, in embodiments. Further, although not shown, an amplifier may be used on the transmitted signal. The power amplifier can also provide isolation if there is a mismatch on the transmission port 308. The tunable oscillator 304 may be any one or more of a continuous wave carrier generator, broadband noise source, chirp signal generator, or spectral comb-based signal generator, or other signal generator where each frequency is stepped after a DC voltage measurement at that frequency.

The network test device 102 may be coupled to a transmission medium for testing of a network in a variety of ways. In one embodiment, where the transmission medium is a cable line, the transmitter port 308 is coupled to a tap (e.g., tap 108) of the cable line, and the receiver port 310 is coupled to the tap via a high impedance probe to provide appropriate isolation of the network test device 102 from the transmission medium. In one embodiment, where the transmission medium is a cable line, the transmitter port 308 and the receiver port 310 are coupled to the cable line transmission medium via a return loss bridge or other high isolation splitter. In one embodiment, the transmission port 308 is coupled to a first transmission medium (e.g., a drop cable) and the receiver port 310 is coupled to a second transmission medium (e.g., a RF antenna) to measure radio wave emissions through the second transmission medium caused by an irregularity on the first transmission medium.

In operation of the network test device 102, the controller 312 sets a CW frequency and testing begins. The controller 312 controls the tunable oscillator 304 to generate a plurality of carrier signals spanning a carrier frequency bandwidth.

Each carrier signal corresponds to a carrier frequency of a plurality of carrier frequencies spanning a carrier frequency bandwidth at which the test is to cover. Frequency domain sampling should obey Nyquist's criteria, with at least two frequency samples per ripple in the frequency domain. If the transmission medium 104 is a long span of cable, carrier frequency samples must be closer together in frequency than if the cable length is short.

In one embodiment, to implement the test, the controller 302 operates the tunable oscillator 304 to rapid stepped across the carrier frequency bandwidth to minimize interference with the receiver 310, which in this embodiment may be receiving in the 5-42 MHz band in the US, and 5-65 MHz in Europe, for example. The receiver (RX) 310 may be a vector receiver using the transmission port 308 as a reference. The transmitter 308 and receiver 310 could also be in a software defined radio. It is desirable for the receiver 310 to be very narrow band and the transceiver 308 to be relatively high power to minimize interference with any data traffic, either upstream or downstream. The receiver 310 may be coupled to the transmission medium 104 via a high-impedance probe. Examples of such high impedance probe include a Trilithic I-Stop and a QTP-20 by Arcom Digital.

Each carrier signal 320C passes through the directional coupler 306 where a portion of the carrier signal 320C is used as a sample carrier signal 320S and input into a local oscillator port 322 of the mixer 314. An example of mixer 314 is a ZAD-1 from Mini-Circuits. In an embodiment, the drive level of the mixer 314 is approximately +7 dBm. The remaining portion of the carrier signal 320R is output from the transmission port 308 into the transmission medium 314.

The network analyzer 104, particularly at the receiver port 310, may receive a plurality of reflection signals 324, each reflection signal 324 corresponding to one of the carrier signals 320R reflected off an irregularity 106 in the transmission medium 104. Where included, the amplifier 312 may amplify the received reflection signals 324 and input them into the input port 326 of the mixer 308. The input port 326 is also known as an RF port where the mixer 314 is a single or double balanced mixer.

The output of the IF port 328 produces an IF signal which consists of a DC (direct current) term and unwanted higher frequency terms, such as harmonics and interfering signals. Thus, the output of the mixer 314 may pass through the filter 316 to remove high frequency energy. The filter 316 may be a low pass filter, or a computational windowing function that zero-values the output of the IF port 328 outside of a chosen window. For example, the filter 316 could be an active filter with a corner frequency of 1 kHz, rejecting signals further away from the CW test signal by more than 1 kHz.

A voltage sample of this filtered signal is then converted to a digital value by the A-D 318 and stored within the memory. The stored data represents in-phase values 230 of the reflection signals 324 as related to the sample carrier signal 320S of the corresponding carrier signal to the given reflection signal.

After taking a number of ADC voltage samples at a number of frequencies spanning the carrier bandwidth associated with the test, the controller 312 and memory stores in-phase only samples 328 that collectively identify a frequency-domain response 330.

The controller 312 may then convert the frequency-domain response 330 to a time-domain response by performing an Inverse Discrete Fourier transform (IDFT) using the recorded in-phase values 328, and zero as each corresponding quadrature value in the IDFT.

The controller 312 may then discard the mirror image values within the time-domain response to generate a halved time domain response 334.

The controller 312 may then perform a Discrete Fourier Transform (DFT) on the halved time-domain response 334 to calculate quadrature values 338 in a calculated frequency response 336 that correspond to the recorded in-phase values 328.

One or both of the calculated quadrature values 338 and the recorded in-phase values 328 may be used to identify impedance reflection/transmission characteristics 340 of the transmission medium 104. Impedance reflection/transmission characteristics 340 include S-parameters of the transmission medium 104 and other characteristics of the irregularity 106 such as distance from the test device 102 to the irregularity 106, and DC components 350 of the irregularity 106 to classify the irregularity as an open or short circuit. In one example of operation, the controller 302 identifies the impedance reflection/transmission characteristics 340. In such embodiment, the controller 302 may display the impedance reflection/transmission characteristics 340 on a display 342 of the testing device 140. In another example, the controller 302 transmits, using a communication module 344 (which may operate according to wired or wireless communication protocols), one or both of the calculated quadrature values 338 and the recorded in-phase values 328 to the remote device 110 for processing thereof.

In one example of identifying the impedance reflection/transmission characteristics 340 of the irregularity 106, the distance 348 from the testing device 104 to the irregularity is identified based on in-phase values only using the location of the peaks in the time-domain response (e.g., by associating each point in the time-domain response with a time value, and adding up the total number of points between each peak in the time-domain response). This example may utilize time-of-flight of the test signal, a time identified as a reciprocal of a frequency difference between peaks within the time-domain response 332, and the transmission medium's velocity of propagation. In embodiments, round-trip transmission line velocity of propagation may further be utilized in calculation of the distance 348.

In one example of identifying the impedance reflection/transmission characteristics 340 of the irregularity 106, the in-phase values 328 and the calculated quadrature values 338 are used to identify a DC component 350 of the data corresponding to each peak within the time-domain response 332. Where the DC component 350 is high (cos 0 deg), it indicates an open reflection short circuit at the irregularity 106. Where the DC component 350 is low (cos 180 deg), it indicates a short circuit at the irregularity 106.

In at least one embodiment, the scan of the carrier frequency bandwidth occurs within 100 ms to provide the advantage that the testing device 102 can operate without putting the transmission medium out of service for its normal operation (e.g., cable line normal operation). In at least one embodiment, the carrier frequency bandwidth is broken down into carrier signals that define over 100 different carrier frequencies.

In at least one embodiment, prior to performing the IDFT on the frequency response 330, the frequency response 330 may be pre-processed or calibrated.

In one example of pre-processing or calibration, a reference trace 346 may be used to divide the linear magnitude of the each recorded in-phase value 328 by a corresponding linear magnitude of recorded in-phase values in the reference trace corresponding to each carrier test frequency.

In another example of pre-processing, a reference trace 346 may be used to subtract corresponding linear magnitude of recorded in-phase values in the reference trace, corresponding to each carrier test frequency, from the linear magnitude of the each recorded in-phase value 328. The reference trace 346 may be captured using the test device 102 (or a similar test device) when there is no irregularity 106 present in the transmission medium.

In another example of pre-processing, the frequency response 330 may be zero-padded prior to performing the IDFT and when the data is inverse discrete Fourier transformed, it will be smoothed, allowing time peaks to be discerned in the time-domain response 332. Zero-padding also provides the advantage of increasing accuracy in polarization at the peaks within the time-domain response, which allows for greater accuracy in identifying the DC component 350.

In another example of pre-processing, the frequency response 330, the controller 302 may apply a mathematical tilt to a tilted signal to render it flat before the IDFT. This tilt removes the difference "step" between the highest and lowest frequencies in the data to be used in the IDFT.

In another embodiment of pre-processing, the frequency response 330 may be analyzed to select a sub-set of the frequency response 330 for use in the IDFT process to generate the time-domain response 332. In such embodiment, only portions of the frequency response 330 with a large standing wave ratio (e.g., at or above a VSWR threshold value 352) are used in the IDFT.

In another example of pre-processing, the in-phase values 328 are each duplicated in the frequency response 330 prior to performing the IDFT. The number of samples is doubled (by repeating each sample) before performing the IFFT, so tossing half of the samples after the transform gets you back to the same number of points. For example, if 128 measurements were taken, 128 complex data points would be returned.

In embodiments, the frequency response 330 may be captured by other means than discussed above. For example, if no digital carriers are available, a spectral plot can be created by other means, such as a stepped continuous wave carrier, a broadband noise source, a chirp signal or even a comb signal. Spectral plots can be captured from a full band capture (FBC) capable cable modem chips. Spectral plots can also be captured from software defined radios (SDRs) and even from analog swept scalar spectrum analyzers. Spectral plots can also be obtained from the OFDM and OFDMA equalization coefficients available in Cable Modem terminals.

In embodiments, the controller 302, or remote device 110, may further verify if the network (or the transmission medium) is minimum phase. To do so, the controller 302, or remote device 110, may compare the calculated quadrature values 328 to measured quadrature values 354 directly captured by a vector network analyzer. If the calculated quadrature values 328 match, within a threshold amount, to the measured quadrature values 354, then it can be determined that the transmission medium is minimum phase. This identification of minimum phase may be implemented in addition to or alternatively to identification of the impedance reflection/transmission characteristics 340.

Figures 4, 5:
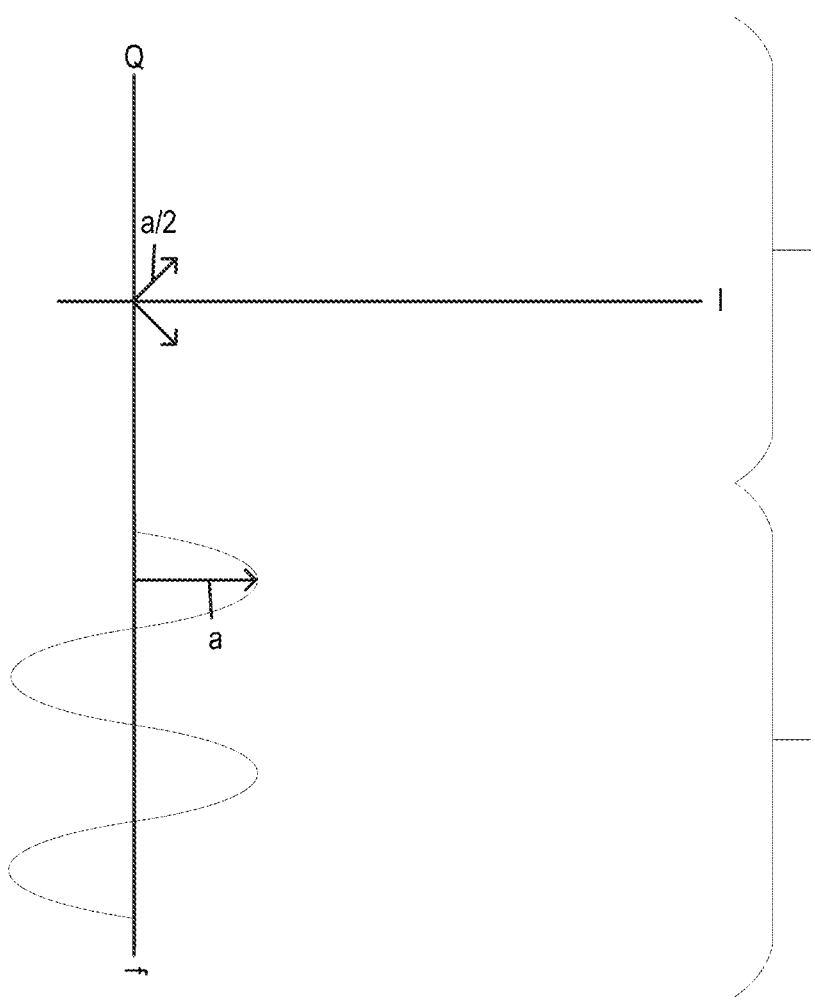
FIG. 4 is a phasor diagram (I-Q plot) showing measured in-phase values.
FIG. 5, which is a standing wave which varies with frequency.

FIGS. 4-5B show the principle of operation behind how controller 302 calculates the quadrature values using only in-phase values, in embodiments. In control theory and signal processing, a linear, time-invariant system is said to be minimum-phase if the system and its inverse are causal and stable. If certain conditions are met, most cable networks can be assumed to be minimum phase networks. FIG. 4 is a phasor diagram (I-Q plot) showing measured in-phase values (e.g., in-phase values 328). These i-values fluxgate above and below a value of "0". It is assumed that there are two mirrored a/2 phasors. Using digital signal processing, it is possible for controller 302 to recreate the missing Quadrature data. What information you have is contained in FIG. 5, which is a standing wave which varies with frequency. It may be viewed as being comprised of one phasor going clockwise, and another equal phasor going counterclockwise. If one of the phasors is eliminated, and a Hilbert transform is taken on the remaining sequence of phasors, the missing imaginary phasor can be recovered. FIG. 5 is a plot of magnitude vs. frequency. The phasor is comprised of two phasors, one rotating clockwise, and one rotating counterclockwise. The two rotating phasors cancel imaginary values and add real values.

Example 1: Distance Identification Via Reflection Test

Figure 6:
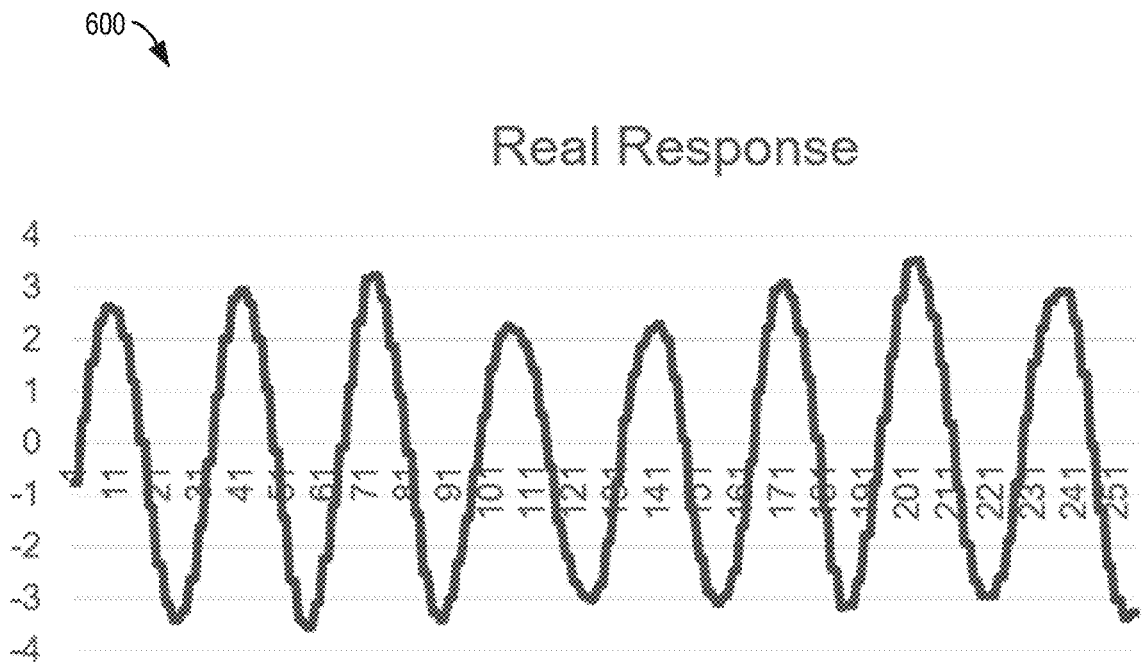
FIG. 6 shows an example frequency response generated by controller analyzing a reflection within the transmission medium, in an embodiment.

FIG. 6 shows an example frequency response 600 generated by controller 302 analyzing a reflection within the transmission medium, in an embodiment. Frequency response 600 is an example of frequency response 330 in FIG. 3. Frequency response 600 spans a 256 different carrier frequencies. A standing wave is shown oscillating above and below zero volts. Frequency response 600 was generated via a single irregularity 106 causing the reflection or transmission.

Figure 7:
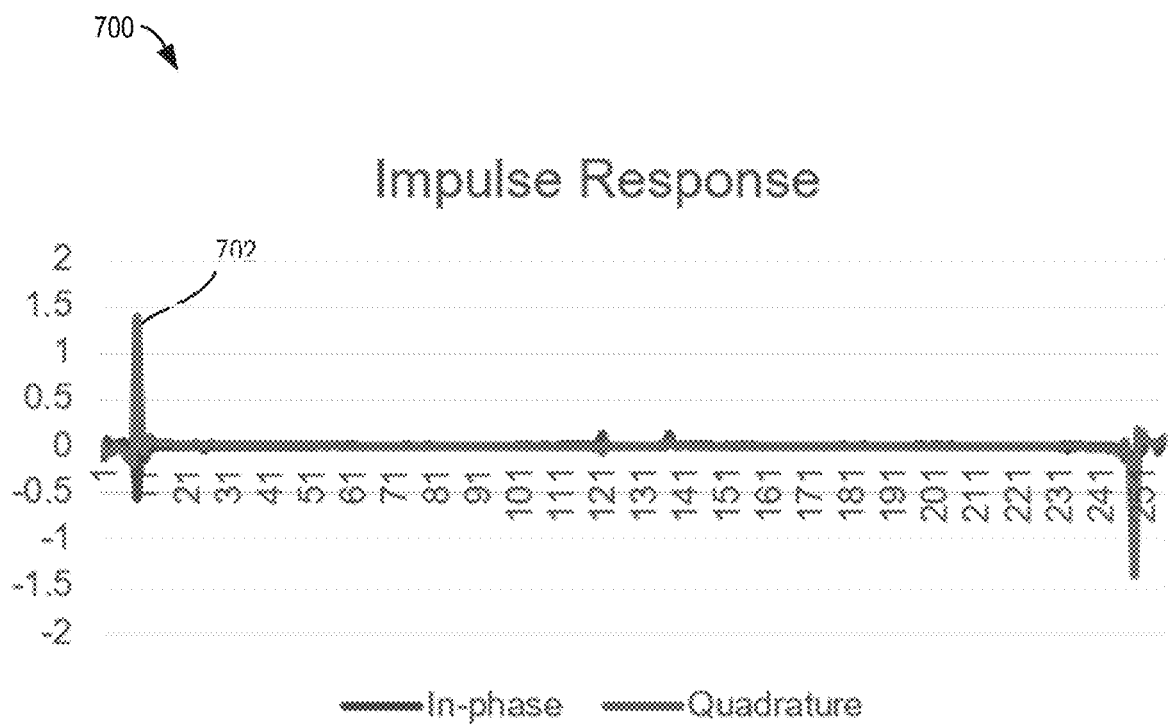
FIG. 7 shows an example time-domain response generated by controller based on the frequency response, in an embodiment.

FIG. 7 shows an example time-domain response 700 generated by controller 302 based on the frequency response 600, in an embodiment. Time-domain response 700 is an example of time-domain response 332 in FIG. 3. As shown, time-domain response 700 is mirrored at approximately point 130. Halved time-domain response 334 would be the points above or below the approximate point 128. Time-domain response 700 was produced by converting the linear voltage frequency samples in the frequency response 600 to linear voltage and using these samples (which correspond to the in-phase values 328 of FIG. 3) for real values in an IDFT. Zeroes were used for all imaginary values (e.g., quadrature values) in the IDFT. The standing wave is highlighted with peak 702. By comparing the time-of-flight of the test signal and the identification of the number of points to the location of peak 702, and using the transmission medium's velocity of propagation, the distance to the irregularity in this example is identified (e.g., as one of the impedance reflection/transmission characteristics 340).

The irregularity causing peak 702 may further be determined as an open, or a short, based on the value of the DC component corresponding to peak 702. If the phase estimate is high (cos 0 deg), the data indicates an open reflection. If the phase estimate is low (cos 180 deg) the cause of the reflection would have been a short circuit.

Example 2: Transmission Test

Figure 8:
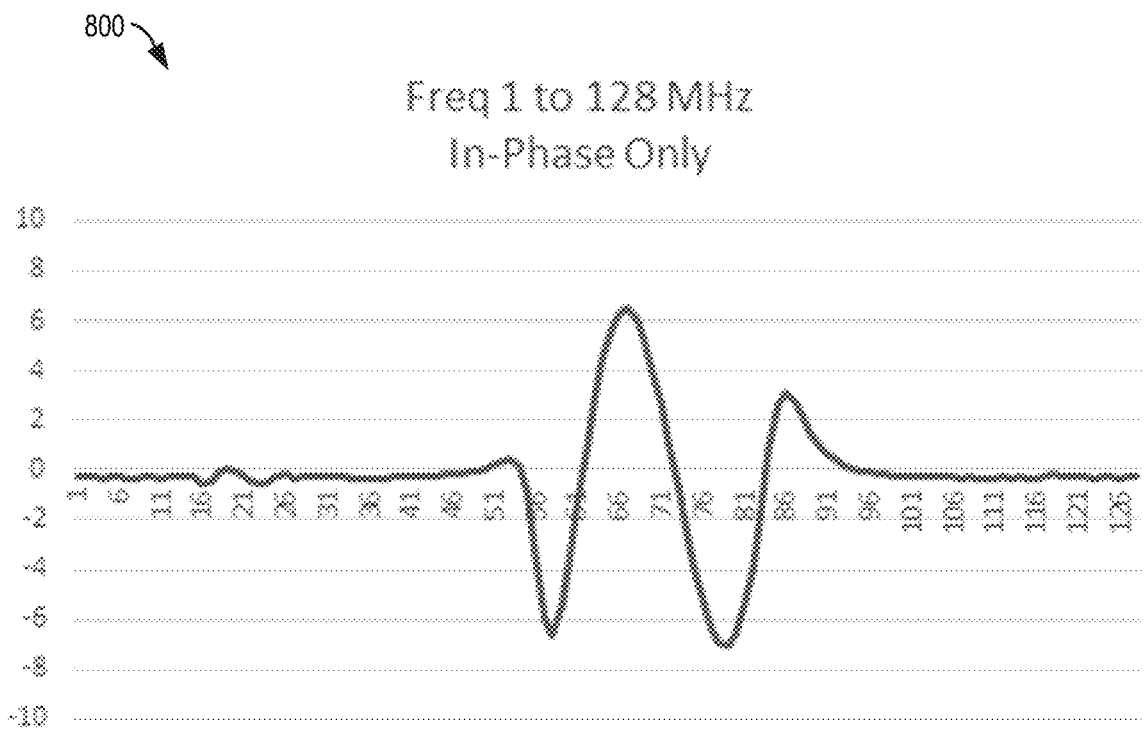
FIG. 8 shows a frequency response of 128 frequency samples (voltages) are taken uniformly between 1 and 26.6 MHz, in an embodiment.

FIG. 8 shows a frequency response 800 of 128 frequency samples (voltages) are taken uniformly between 1 and 26.6 MHz, in an embodiment. Frequency response 800 is an example of frequency response 330. Note that in the band-pass region, a sinusoidal response is observed. Elsewhere the response is zero per implementation of the filter 316.

Figure 9:
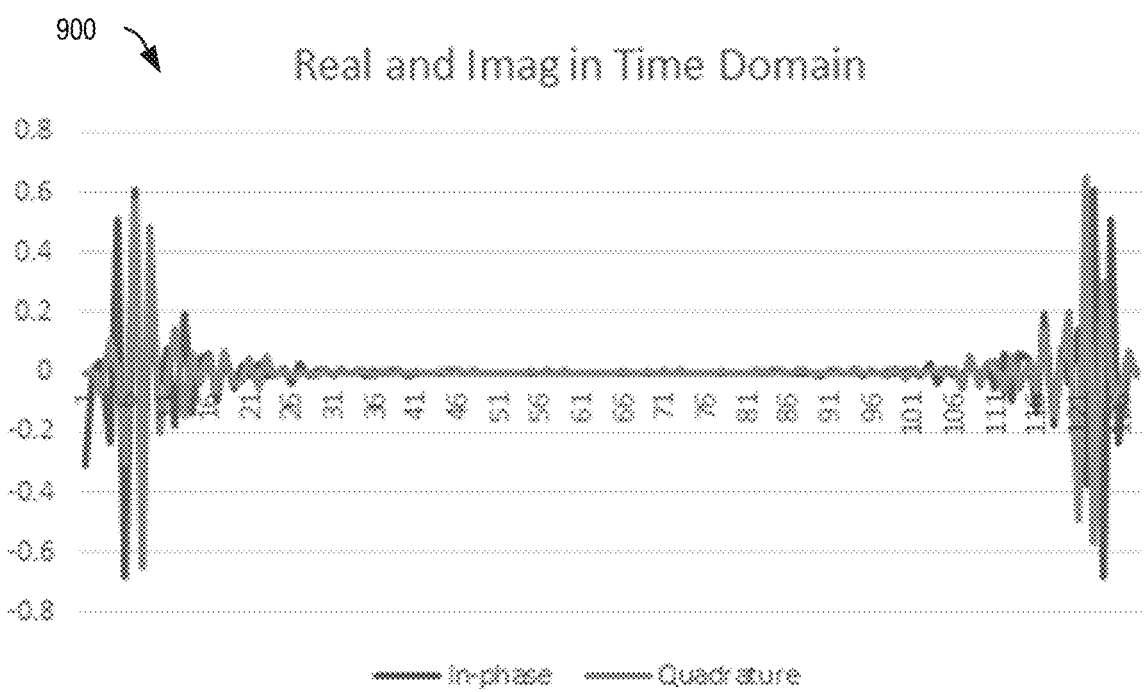
FIG. 9 shows a time-domain response generated via implementation of IDFT on the frequency response, in an embodiment.

FIG. 9 shows a time-domain response 900 generated via implementation of IDFT on the frequency response 800, in an embodiment. Time-domain response 900 is an example of time-domain response 332. In embodiments, time-domain response 900 may be generated using only the points within the bandpass region where a standing wave is present. In other words, the calculation may be implemented on only a sub-portion of the 128 frequency samples where the test signal amplitude is above a pre-determined threshold (e.g., threshold 352). Time-domain response 900 has a few notable features. One is that the delay is offset from zero time by a few samples. This is due to the time delay associated with the test leads and the filter's delay. Another is that the early time samples and late time samples are mirrors of each other, with the note that imaginary values are inverses, and real values are identical. That is a direct result of using zeroes for imaginary values during the IDFT.

Figure 10:
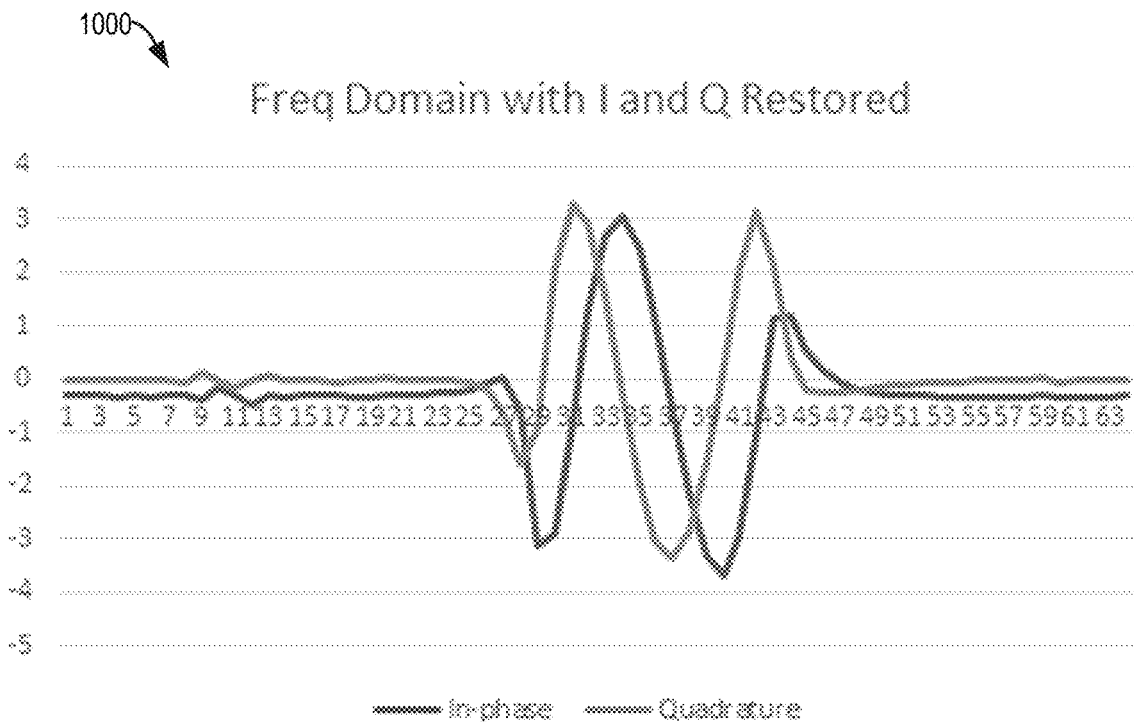
FIG. 10 shows a calculated frequency response based on half of the data in the time-domain response of FIG. 9, in an embodiment.

FIG. 10 shows a calculated frequency response 1000 based on half of the data in the time-domain response 900 of FIG. 9, in an embodiment. Calculated frequency response 1000 is an example of calculated frequency response 336. Calculated frequency response 1000 includes 64 I and Q frequency voltage samples derived from half of the 128 data points in time-domain response 900. Note that the I samples look similar to the I samples in frequency response 800, except the voltage amplitude has been halved due to the truncation of 64 redundant time samples.

Figure 11:
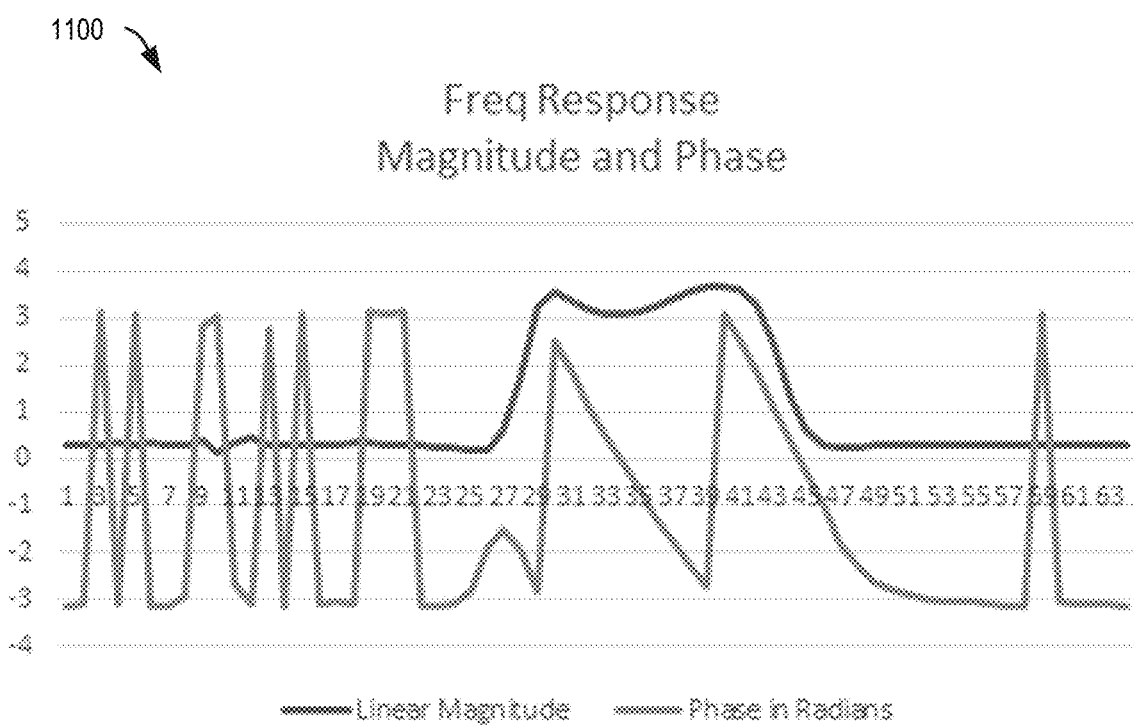
FIG. 11 shows calculated frequency response plotted as magnitude and phase values.

FIG. 11 shows calculated frequency response 900 plotted 1100 as magnitude and phase values. Note that phase values are meaningless at frequencies where there is no RF energy. Thus, magnitude and delay values are rendered. Group delay is the derivative of the phase values. Group delay=$-d\varphi/d\omega$.

Home Coaxial Shield Integrity Testing:

It is estimated about one in about eight homes has bad shield integrity, and upstream noise gets into the cable systems, costing operators billions of dollars annually for troubleshooting and repair. This phenomenon is known as noise funneling and is difficult for technicians to troubleshoot because of cable's tree-and-branch architecture. The following examples 5 and 6 present a simple type of radar which enables two ways to test the home wiring integrity without gaining access to the insides of the homes. The first is a radiated leakage test, also known as a "pressure test" but with an added capability of providing distance estimates to a shield break. The second is a conducted sheath current induction test for discovering shield breaks that also provides distance estimates.

Example 3: RF Wireless Leak Detection

Figure 12:
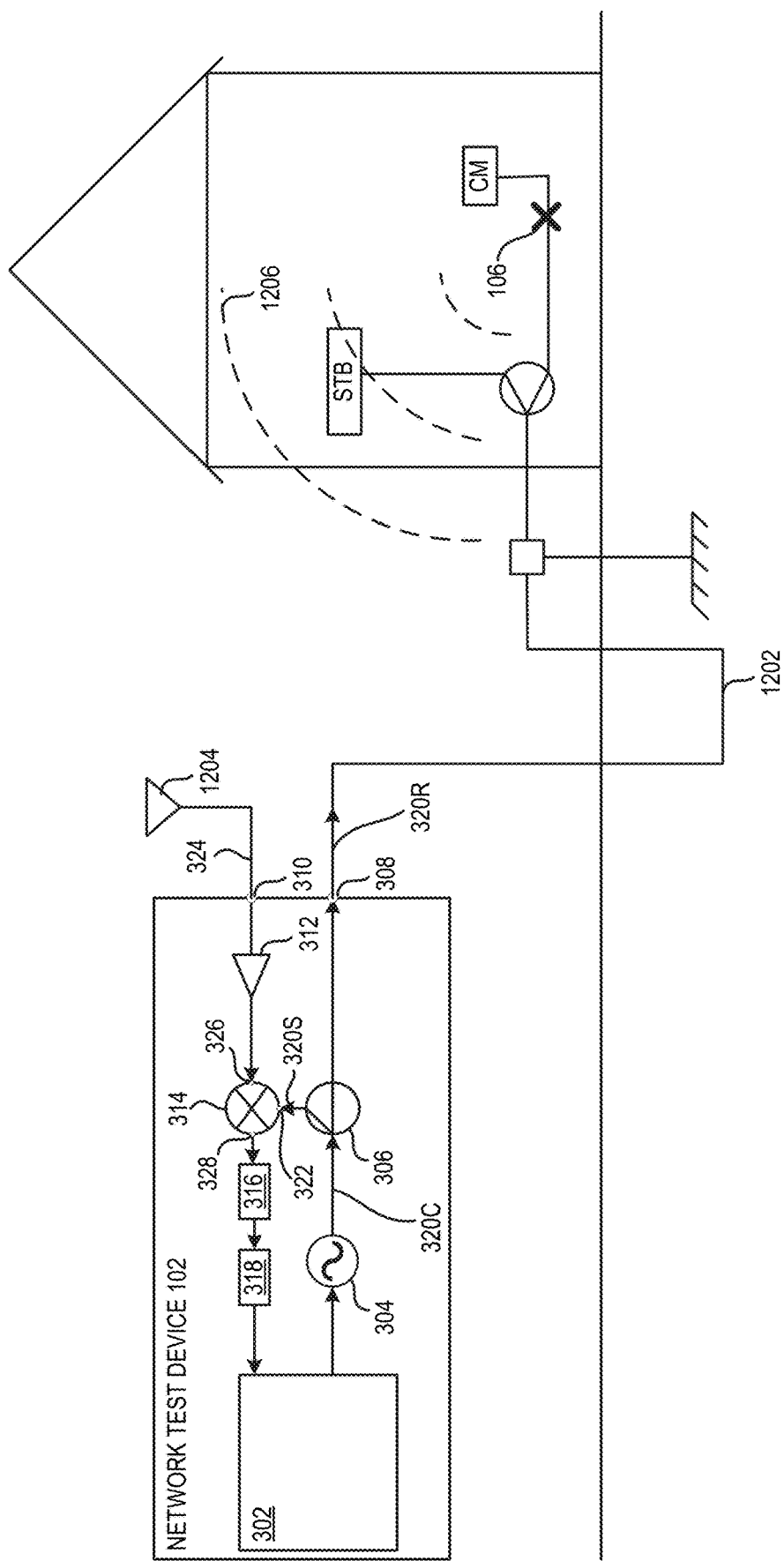
FIG. 12 shows an example use case of the test device of FIGS. 1-3 for signal leakage detection.

FIG. 12 shows an example use case of the test device 102 of FIGS. 1-3, above. A tech goes to a tap and disconnects the buried drop cable 1202 and hooks it up to the transmission port 308 of the test device 102. The receiver port 310 is coupled to an RF antenna 1204. A strong CW signal is transmitted from the transmission port 308 into the house on the drop cable 1202 attached to transmission port 308. The tech points the RF antenna 1204 at the house to receive a radiated signal 1206 caused by irregularity 106 which may be a coax shield break. If irregularity 106 is a shield break on the cable, for example, it will produce leakage radiation, which likely will vary in severity with frequency. Amplifier 312 may be a radio frequency (RF) amplifier that amplifies antenna's signal and the signal goes into a R (receive) port 326 on mixer 314 (which may be a double balanced mixer). If there is a leak there will be a DC voltage produced at the I (intermediate frequency) output 328 of the mixer 314. The mixer's L (local oscillator) input 322 is provided by the direction coupler 306 connected to an agile transmitter 308 which sends the continuous wave (CW) test signal. Controller 302, as discussed above, shifts frequencies and records new DC values. The voltage samples at each frequency values are low pass filtered via filter 316 and converted into digital format by analog-to-digital converter 318. The samples 328 are used as real frequency coefficients in an Inverse Fast Fourier Transform (IFFT), and zeroes are used for imaginary frequency coefficients. The transform produces a time plot (impulse response) a distance to the shield break can be determined from the earliest return time. Note that a radiated CW signal from inside a home will normally have a lot of multipath distortion and an earliest time sample is the one produced by the most direct path. The time estimates are round-trip times, including transit time in the coaxial cable plus fly-time through the air.

Example 4: Sheath Current Induction Test

Figure 13:
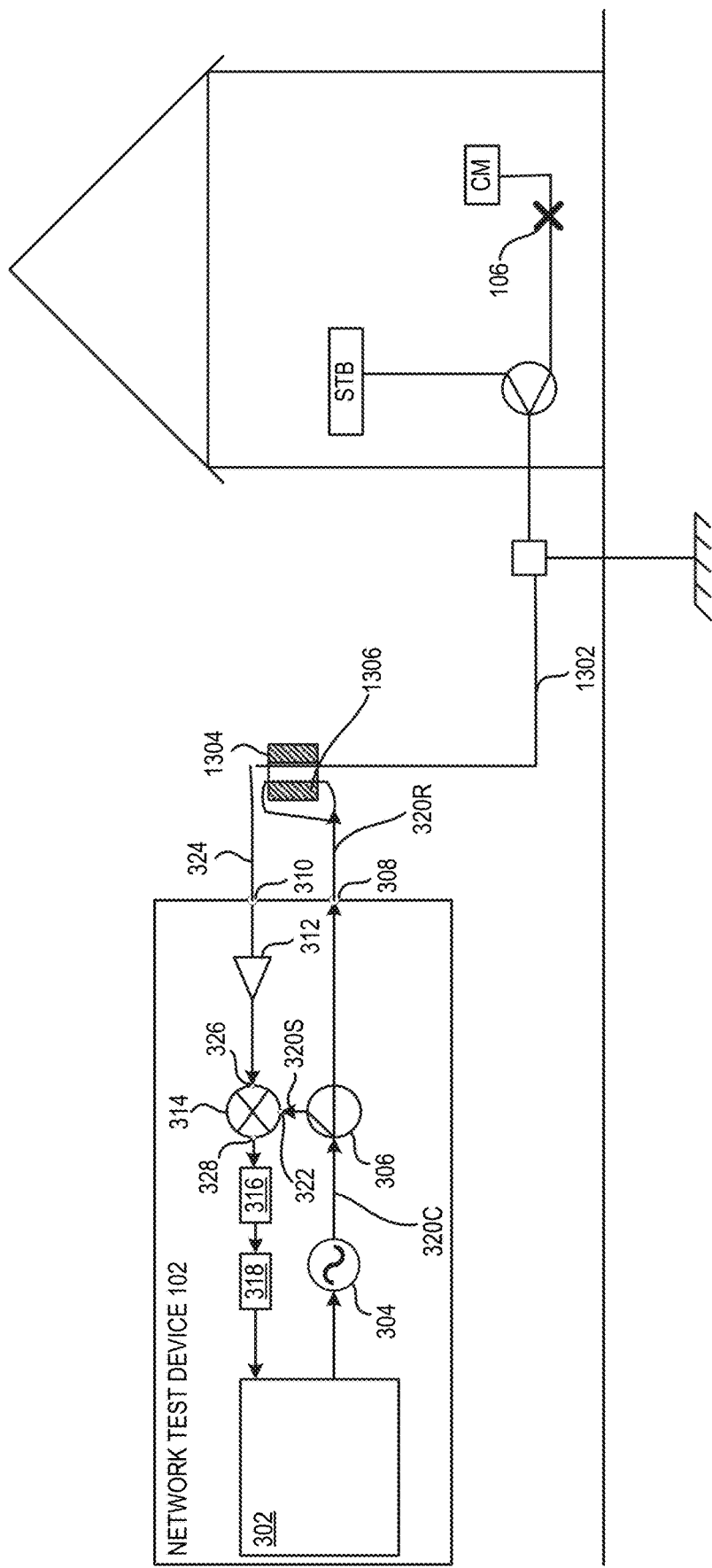
FIG. 13 shows an example using test device of FIG. 1 in a sheath current induction test, in an embodiment.

FIG. 13 shows an example using test device 102 of FIG. 1 in a sheath current induction test, in an embodiment. The carrier frequency bandwidth for a sheath current induction test used by test device 102 may be lower, such as 1-50 MHz.

At the tap, the tech disconnects the cable 1302 and connects it to the receiver port 310 of test device 102. Cable 1302 is shown as above-ground in circumstances where soil will absorb portions of the signals and thus reduce effectiveness of test device 102. The tech also connects the transmission port 308 of test device 102 onto a coupling ferrite transformer 1304 that couples the CW test signal onto the outside of the drop cable 1302. The coupling transformer 1304 has a single-turn primary 1306 connected to the transmission port 308, and the shield of the coax acts as a single-turn secondary winding. The carrier signal 320R goes inside the home and enters the coax center conductor at a shield break. From there it travels back to the test device 102 location where it is received at receiver port 310. The same radar test set block diagram in FIG. 12 is used by FIG. 13, but frequencies are lower since the outside of the coax is used (high frequencies don't reach as far due to radiation losses). The distance to the shield break can be ranged from round trip time, half inside the coax, half on the outside (sheath).

An ideal signal to use is as the carrier signal 320R a stepped chirp signal, such as is described in U.S. Pat. No. 6,140,822 System for Signal Path Characterization with A Reference Signal Using Stepped-Frequency Increments, which is incorporated by reference herein. The stepped chirp signal dwells at each frequency long enough to take a sample, which is determined by the settling time of the low pass filter (LPF). However, test device 102 is just as good as a chirp, and much cheaper.

Example 5: Return/Loss Bridge

Figure 14:
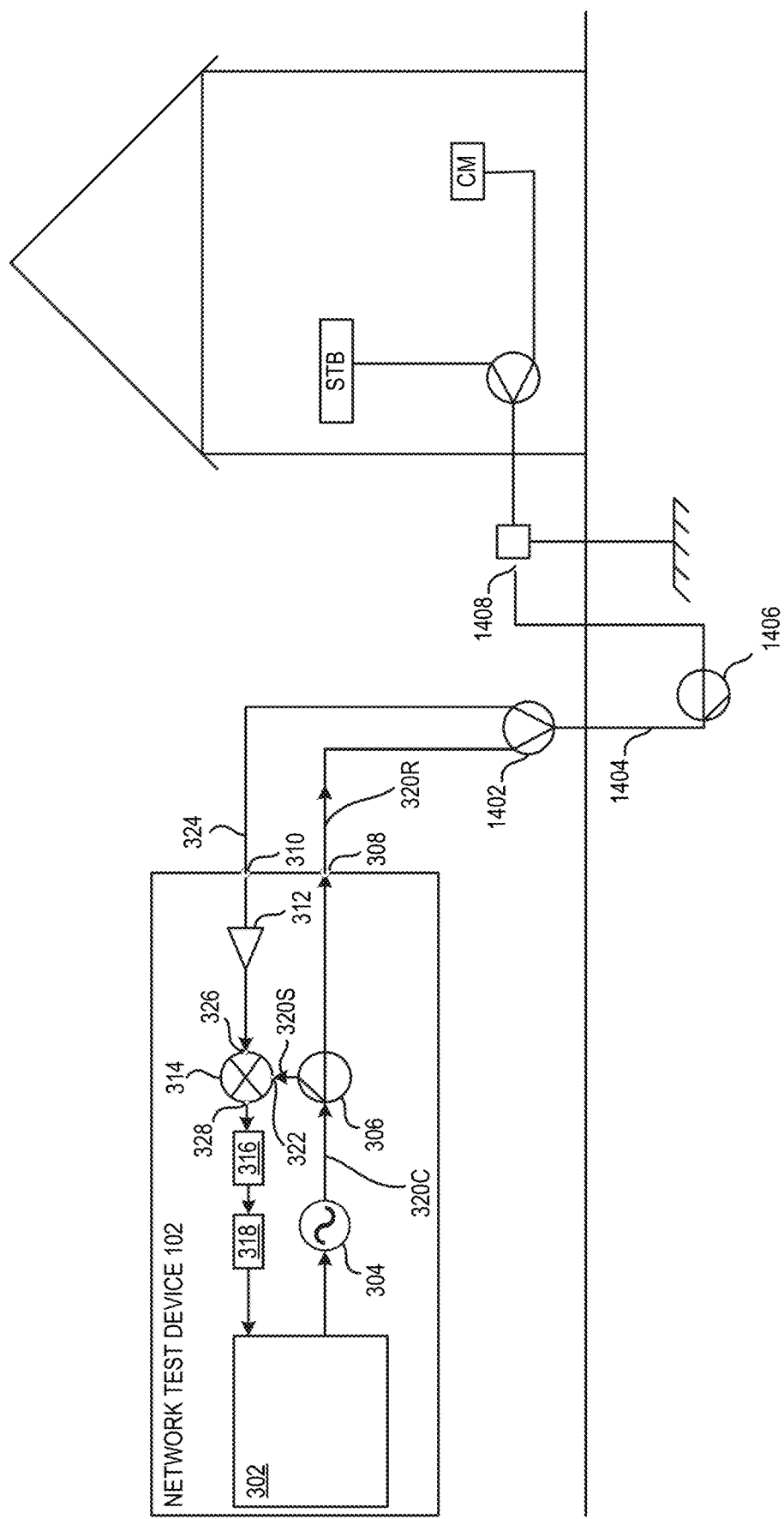
FIG. 14 shows a diagram of the test device of FIG. 1 being coupled to a drop cable via a return loss bridge, in an embodiment.

FIG. 14 shows a diagram of the test device 102 of FIG. 1 being coupled to a drop cable via a return loss bridge 1402, in an embodiment. The transmission port 308 and the receiver port 310 are coupled to two ports on the return loss bridge 1402, which is also coupled to the drop line 1404. The return loss bridge 1402 may be a high-isolation splitter without departing from the scope hereof Implementation of the above-described operation of controller 302 then allows for the controller 302 to utilize a 2× value of the insertion loss of the transmission medium drop cable 1404 and a round trip time to an open (or short) circuit 1408 to identify when a pirate tap 1406 (or other damage such as a short circuit if the drop-line 1402 is damaged) is present via mismatch to an expected reflection time as compared to the known insertion loss. Another impairment of interest that can be detected with this test method is water inside coaxial cables, which increases attenuation and produces irregular ripples in a captured frequency response by test device 102.

Example 6: Upstream Cable TDR

Figure 15:
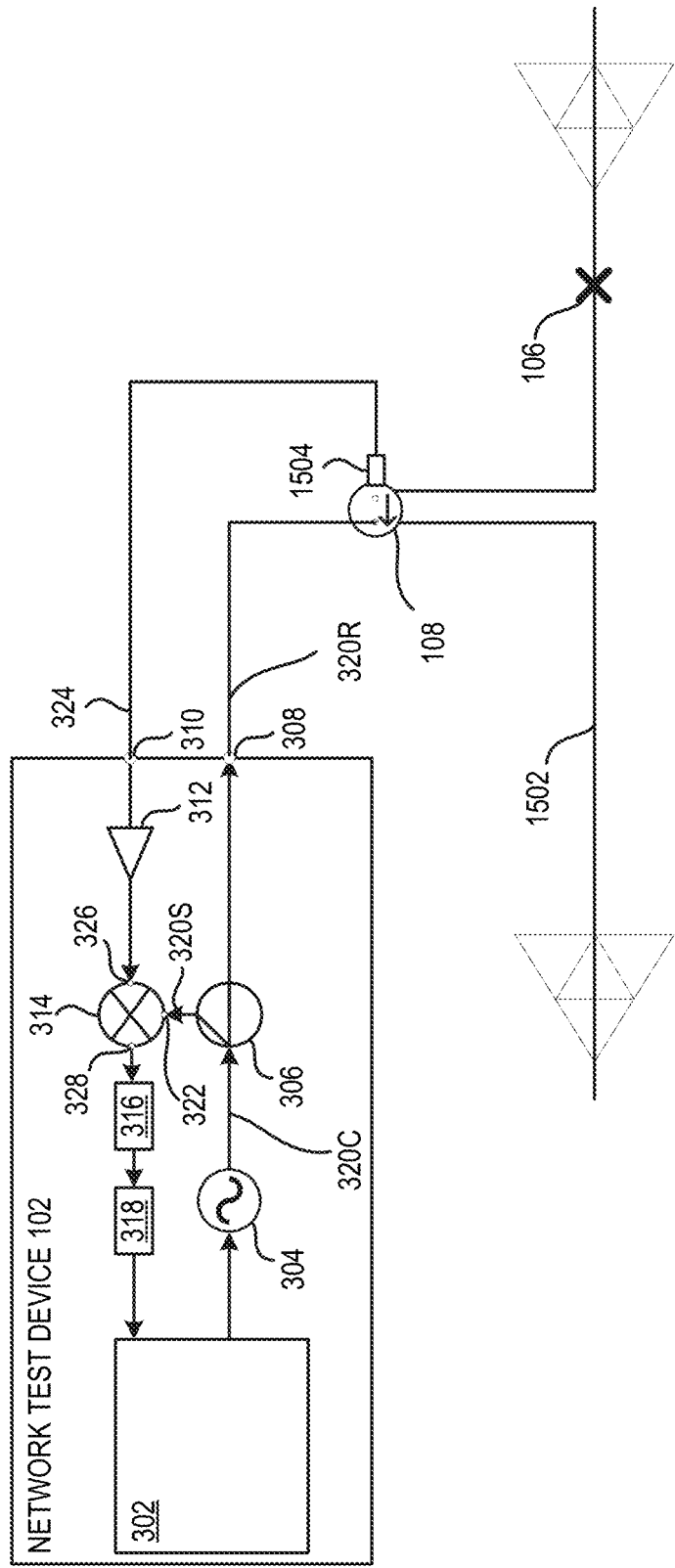
FIG. 15 shows a diagram of the test device of FIG. 1 being coupled to a cable line via a tap and high impedance probe to identify an irregularity upstream from the test device, in embodiments.

FIG. 15 shows a diagram of the test device 102 of FIG. 1 being coupled to a cable line 1502 via a tap 108 and high impedance probe 1504 to identify an irregularity 106 upstream from the test device 102, in embodiments. Implementation of the above-described operation of controller 302 then allows for the controller 302 to identify the location (and whether it is a short or open circuit) of the irregularity 106.

Example 7: Antenna Analysis

Figure 16:
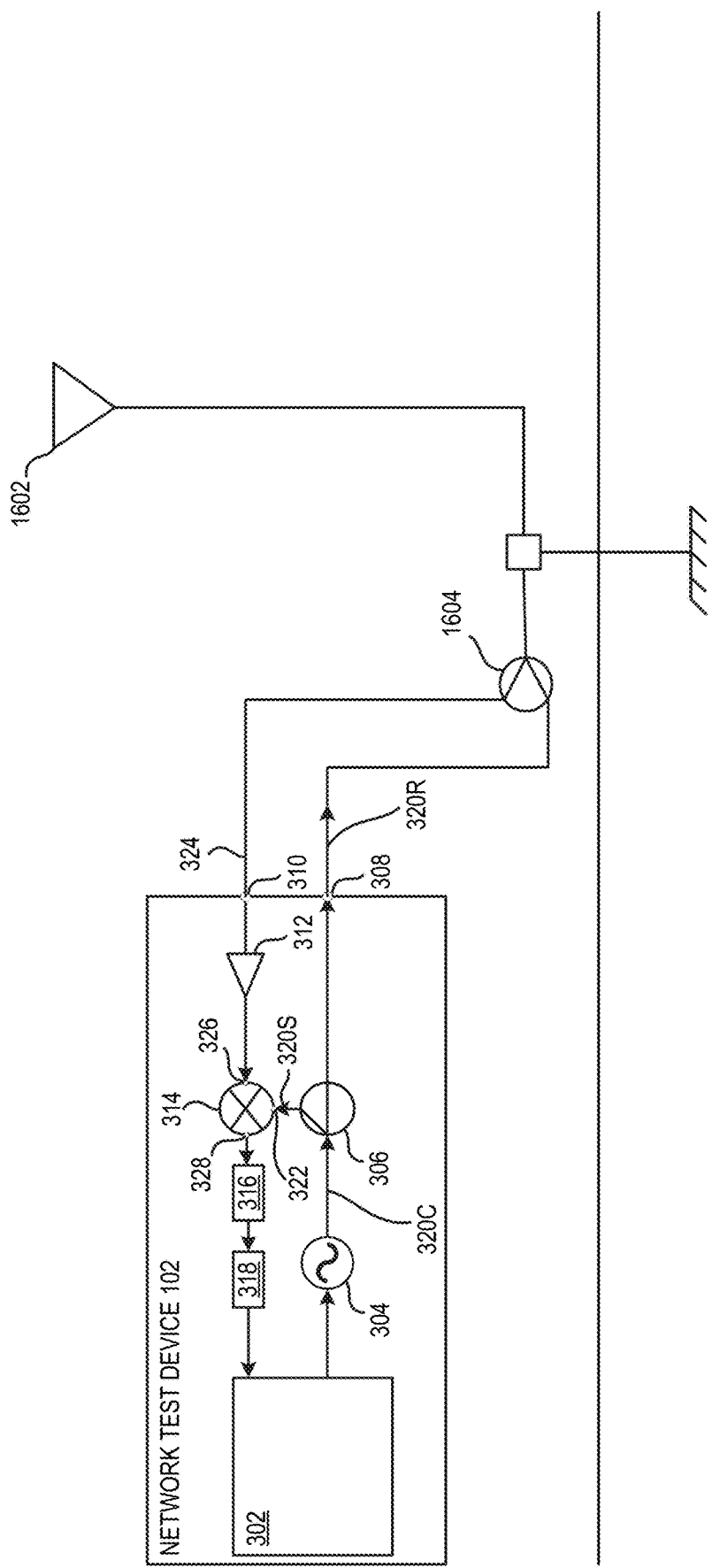
FIG. 16 shows a diagram of the test device of FIG. 1 being coupled to an antenna via a return-loss bridge to identify characteristics of the antenna system from the test device, in embodiments.

FIG. 16 shows a diagram of the test device 102 of FIG. 1 being coupled to an antenna 1602 via a return-loss bridge 1604 to identify characteristics of the antenna system 1602 upstream from the test device 102, in embodiments. Implementation of the above-described operation of controller 302 then allows for the controller 302 to identify characteristics, such as S-parameters to tune the antenna system 1602.

Example 8: Verification of Minimum Phase Network

Figure 17:
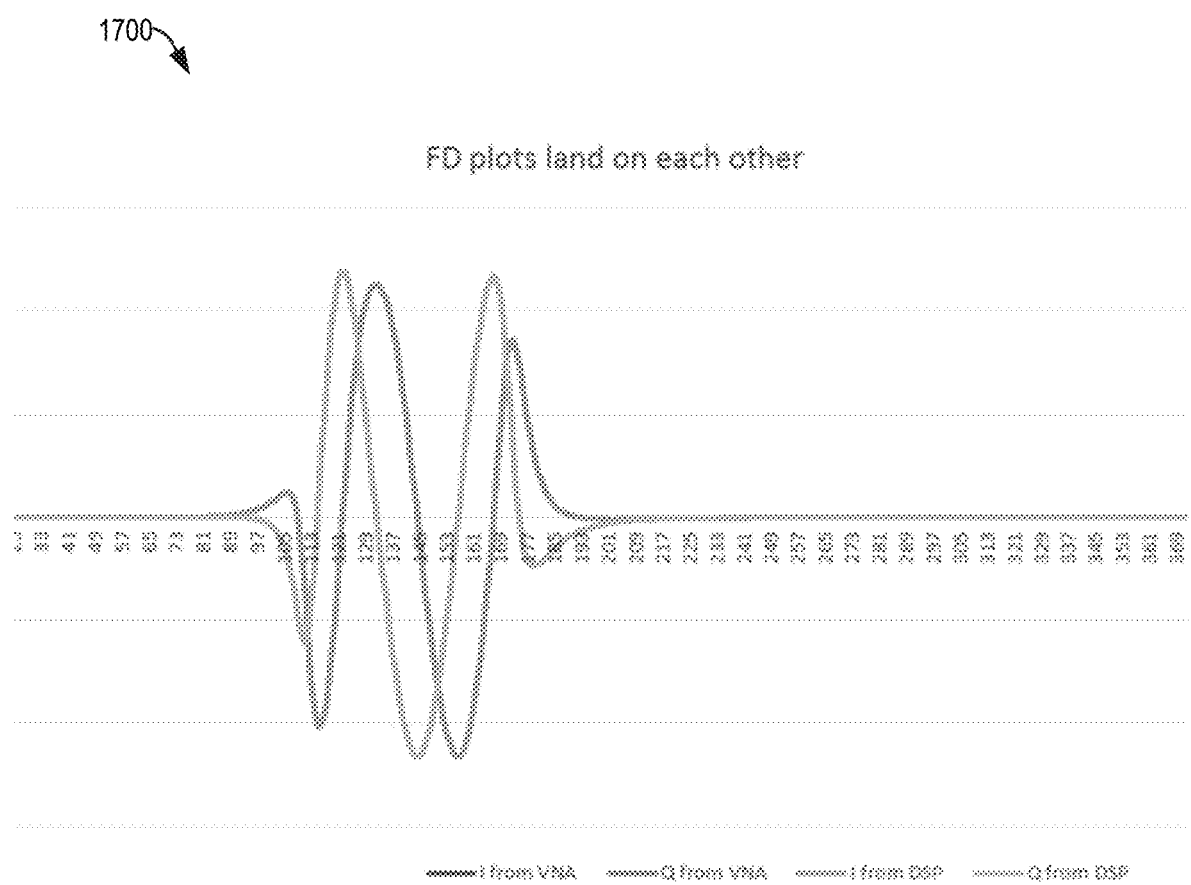
FIG. 17 shows a comparison of measured quadrature and in-phase values measured by a vector network analyzer to recorded in-phase values and calculated quadrature values identified by a network test device of FIG. 1, in embodiments.

FIG. 17 shows a comparison 1700 of measured quadrature and in-phase values measured by a vector network analyzer to recorded in-phase values and calculated quadrature values identified by a network test device 102 of FIG. 1, in embodiments. This test was done on a bandpass filter. As shown the measured quadrature and in-phase values measured by a vector network analyzer to recorded in-phase values and calculated quadrature values identified by a network test device 102 of FIG. 1 overlap (because two I-lines and two Q-lines are not visible) and thus the transmission medium to which the data was obtained from can be said to be minimum phase. Identification of minimum phase networks may be valuable in troubleshooting various issues associated with the network.

The above-discussed systems and methods provide many advantages over prior art network analyzer systems. The processing steps are a method of performing a Hilbert transform on I data to find Q data. By utilizing a simple device to identify distance from the device, any technician may speed their repair of the network being analyzed (e.g., two devices under test are house coaxial cabling, with one test being wireless leakage, and the other a conducted wired sheath current induction test) without the need for extremely expensive vector network analyzers.

The cost of equipment to implement the present systems and methods is very low, so line technicians and installers can afford to have this test gear to speed their troubleshooting. Frequency domain quadrature data is not needed for measurements of delay, group delay, frequency response or impulse response: in-phase values alone are all that is needed. Thus, the present invention may replace an entire class of expensive test equipment, the vector network analyzers, providing a much cheaper solution.

Note that this test set can be attached to a return loss bridge (or just a high-quality splitter with isolation between legs) to make return loss measurements. That is, S-parameters S11 can be obtained as well as S21.

Calibration can be used to improve test results. Inherently, the errors of prior art complex demodulators, such as I-Q amplitude and phase imbalance, are eliminated with I-only sampling.

The systems and methods herein can be used as a form of stepped CW radar. Cost is sufficiently low that blind guys can use this form of radar to avoid obstacles.

Stepped CW radar can also be used for ground penetrating radar to find buried objects, such as water pipes, foundations of ancient civilizations.

Testing can occur very rapidly, particularly where the oscillator 304 as numerically-controlled-oscillators (NCO, a.k.a. direct digital synthesis DDS) can change frequency on the next clock cycle, so frequency jump time is determined by the settling time on the filter 316. Note that having a filter 316 with a long settling time reduces susceptibility to noise, but takes longer to test.

Another application for measuring return loss is tuning and testing of RF antennas, particularly Ham radio antennas.

Because a quadrature channel is not needed in the present systems and methods as compared to conventional vector network analyzers, working frequency range is higher, right up to optical frequencies. So, the present systems and methods are applicable for optical tomography medical applications, such as testing retinas, or evaluating cancer cells using frequency tunable lasers.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method for locating an irregularity on a transmission medium, comprising:
   transmitting, from a network testing device on the transmission medium, a plurality of carrier signals each corresponding to a carrier frequency of a plurality of carrier frequencies spanning a carrier frequency bandwidth;
   receiving, at the network testing device, a plurality of reflection signals, each reflection signal corresponding to one of the carrier signals reflected off an irregularity in the transmission medium;
   identifying a frequency-domain response by, for each of said reflection signal, recording an in-phase value of the reflection signal as related to a sampled component of the corresponding carrier signal;
   converting the frequency-domain response to a time-domain response by performing an inverse discrete Fourier transform (IDFT) using the recorded in-phase values, and zero as each corresponding quadrature value in the IDFT;
   generating a halved time-domain response by discarding mirror image values of the time-domain response;
   calculating quadrature values of the frequency-domain by performing a Discrete Fourier transform (DFT) on the halved time-domain response; and
   determining a characteristic of the irregularity or transmission medium based on one or both of the in-phase value and the calculated quadrature values.

2. The method of claim 1, wherein the transmitting the plurality of carrier signals includes transmitting over 100 different carrier frequencies.

3. The method of claim 1, wherein the transmitting the plurality of carrier signals is implemented within 100 ms.

4. The method of claim 1, further comprising calculating a voltage standing wave ratio over the frequency-domain response;
wherein said converting the in-phase values of the received reflection signals to a time-domain response includes converting a subset of the in-phase values of the received reflection signals corresponding to portion of the frequency-domain response having a calculated Voltage Standing Wave Ratio (VSWR) above a VSWR threshold.

5. The method of claim 4, further comprising generating zero padding values before and after the subset of in-phase values of the received reflection signals prior to said converting, wherein said converting includes using the zero padding values and the subset of in-phase values of the received reflection signals.

6. The method of claim 1, further comprising generating zero padding values before and after the in-phase values of the received reflection signals prior to said converting; wherein said converting includes using the zero padding values and the in-phase values of the received reflection signals.

7. The method of claim 1, wherein said determining the characteristic of the irregularity comprises determining, based on spacing between harmonics in the time domain, distance between the network testing device and the irregularity.

8. The method of claim 7, wherein said determining distance between the network testing device and the irregularity includes:
determining time delay between each point in the time-domain based on a reciprocal of a bandwidth of the in-phase values used in said converting, and
multiplying the time delay by the number of points between adjacent harmonics in the time delay response.

9. The method of claim 1, wherein said determining the characteristic of the irregularity comprises determining whether the irregularity is a short-circuit or an open-circuit in the transmission medium based on the recorded i-phase values and the calculated quadrature values.

10. The method of claim 1, wherein the network testing device is coupled to the transmission medium via a high-impedance probe.

11. The method of claim 1, each carrier signal being an optical signal.

12. The method of claim 1, each carrier signal being a radio frequency signal.

13. The method of claim 1, the recording an in-phase value including recording each in-phase value twice.

14. The method of claim 1, further comprising: comparing the calculated quadrature values to measured quadrature values; and identifying the transmission medium as minimum phase when the calculated quadrature values are equal, within a threshold value, to the measured quadrature values.

15. A system for identifying an irregularity in a transmission medium, comprising:
a carrier signal generator;
a transmission port coupled to the carrier signal generator that, when the system is in operation, is coupled to the transmission medium, wherein a plurality of carrier signals are input into the transmission medium via the transmission port;
a receiver port that, when the system is operation, receives a plurality of reflection signals each corresponding to one of the carrier signals reflected off of an irregularity within the transmission medium;
a mixer having:
an input port coupled to the receiver port,
a local oscillator (LO) port, wherein a sample component of an output of the carrier signal generator is input to the LO port, and
an output port that outputs an intermediate frequency (IF) signal;
an analog-to-digital converter (ADC) coupled to the output port; and,
a processor coupled to the carrier signal generator and the ADC and configured to control the system to identify distance between the system and the irregularity based on in-phase signals, as related to the sampled component, output by the ADC.

16. The system of claim 15, the carrier signal generator being a tunable oscillator.

17. The system of claim 16, wherein, to identify the distance, the processor is configured to:
transmit, using the tunable oscillator, the plurality of carrier signals each corresponding to a carrier frequency of a plurality of carrier frequencies spanning a carrier frequency bandwidth,
identify a frequency-domain response by recording in-phase values, as related to a sampled component, output by the ADC in response to each reflection signal of a plurality of reflection signals respectively corresponding to the carrier signals reflecting off the irregularity,
converting the frequency-domain response to a time-domain response by performing an inverse discrete Fourier transform (IDFT) using the recorded in-phase values and zero as each corresponding quadrature value in the IDFT; and
determining, based on spacing between harmonics in the time-domain response, the distance.

18. The system of claim 15, the processor further configured to control the system to identify the irregularity as a short-circuit or open-circuit based on a DC component corresponding to the harmonics.

19. The system of claim 15, further comprising an amplifier located between the receiver port and the mixer.

20. The system of claim 15, further comprising a filter located between the output port and the ADC.

21. The system of claim 15, the carrier signal generator being one of a tunable oscillator, a continuous wave carrier generator, broadband noise source, chirp signal generator, or spectral comb.

22. The system of claim 15, the carrier signals being radio frequency signals, the mixer being an RF mixer.

23. The system of claim 15, the carrier signals being optical signals, the mixer being an optical mixer.

24. The system of claim 15, all of the carrier signals being generated within 100 ms.

25. The system of claim 15, the receiver port being coupled to the transmission medium via a high impedance probe.

26. A method for determining if a network is minimum phase, comprising:
transmitting, from a network testing device on a transmission medium, a plurality of carrier signals each corresponding to a carrier frequency of a plurality of carrier frequencies spanning a carrier frequency bandwidth;
receiving, at the network testing device, a plurality of reflection signals, each reflection signal corresponding to one of the carrier signals reflected off an irregularity in the transmission medium;

identifying a frequency-domain response by, for each of said reflection signal, recording an in-phase value of the reflection signal as related to a sampled component of the corresponding carrier signal;

converting the frequency-domain response to a time-domain response by performing an inverse discrete Fourier transform (IDFT) using the recorded in-phase values, and zero as each corresponding quadrature value in the IDFT;

generating a halved time-domain response by discarding mirror image values of the time-domain response;

calculating quadrature values of the frequency-domain by performing a Discrete Fourier transform (DFT) on the halved time-domain response; and comparing the calculated quadrature values to measured quadrature values; and identifying the network as minimum phase when the calculated quadrature values are equal, within a threshold value, to the measured quadrature values.

* * * * *